Dec. 30, 1969   W. D. ALLISON   3,486,575
REAR SUSPENSION SYSTEM FOR A MOTOR VEHICLE
Original Filed March 23, 1967   2 Sheets-Sheet 2

WILLIAM D. ALLISON
INVENTOR

BY John R. Faulkner
Clifford L. Sadler

ATTORNEYS

# United States Patent Office 3,486,575
Patented Dec. 30, 1969

3,486,575
REAR SUSPENSION SYSTEM FOR A MOTOR VEHICLE
William D. Allison, Grosse Pointe Farms, Mich., assignor to Ford Motor Company, Dearborn, Mich., a corporation of Delaware
Continuation of application Ser. No. 625,511, Mar. 23, 1967. This application Aug. 1, 1968, Ser. No. 756,708
Int. Cl. B60k *17/00, 23/00*
U.S. Cl. 180—71                14 Claims

ABSTRACT OF THE DISCLOSURE

A rear suspension system for motor vehicles having a pair of suspension arms connecting the axle housing to the chassis. The arms are linked to the axle housing by means of a balancing lever which has its ends connected to the arms and a point spaced from the midpoint of the lever connected to the housing. The off-center pivot of the lever equalizes the traction between the rear wheels during acceleration.

Background of the invention

This application is a continuation of my earlier filed application Ser. No. 625,511 filed Mar. 23, 1967 and since abandoned.

In a motor vehicle having a rigid axle housing interconnecting the driving wheels, it is necessary to provide means for resisting rotation of the axle housing during acceleration. Several ways are suggested in the prior art. In a Hotchkiss rear suspension, the axle housing is clamped to the middle of longitudinally extending leaf springs and the leaf springs resist rotation of the axle housing. In a coil spring suspension, it is not uncommon to provide a pair of trailing arms and one or two upper arms that are pivotally connected to the axle housing. In combination, these arms absorb the torque reaction. Suspensions employing torsion bars are usually of the multiple arm type similar to those having coil springs.

The present invention is particularly adaptable to rear suspension systems using either coil or torsion bar springs. Such a suspension is characterized by improved ride and handling qualities. There is also a notable reduction in harshness with a suspension of this type.

Brief summary of the invention

In accordance with the preferred embodiment of this invention, a rear suspension system for a motor vehicle having a rigid axle housing that journals left and right driving wheels is provided. A pair of longitudinally extending suspension arms have their forward ends pivotally connected to the chassis frame and at an intermediate point pivotally connected to the axle housing. A balancing lever is pivotally supported on the axle housing at a point to the right of its center (when viewed from the rear). The outer ends of the balancing lever are linked by shackles to the rear ends of the suspension arms. Lateral stability of the axle housing is achieved by a pair of lateral arms that are connected to the axle housing adjacent to the wheels and extend inwardly to a pair of spring metal hangers. The vehicle body is resiliently supported on the axle by means of torsion bars that extend between the frame and the lateral arm.

This suspension achieves a number of desirable objects. While the attachment of the suspension arms resist rotation of the axle housing, the axle is permitted to rotate or windup a few degrees when subjected to acceleration or breaking forces. This construction lowers the resonant torsional frequency of the driveline, permits tuning of the driveline to avoid torsional resonance at a frequency near wheel hop frequency, reduces harshness and increases traction and road holding. It also provides a means for tuning the system to decrease power transmission disturbances.

By supporting the lateral arms from spring metal hangers, the axle housing is permitted to move laterally to a limited extent. The advantages of this lateral compliance are described in my Patent 3,171,642 issued Mar. 2, 1965 entitled "Vehicle Wheel Suspension Having Lateral Compliance."

Brief description of the drawings

These and other objects of the present invention will become apparent upon consideration of the following detailed discussion and the accompanying drawings, in which:

FIGURE 4 is a view taken on line 4—4 in FIGURE 2.

Detailed description of the invention

Figure 1:
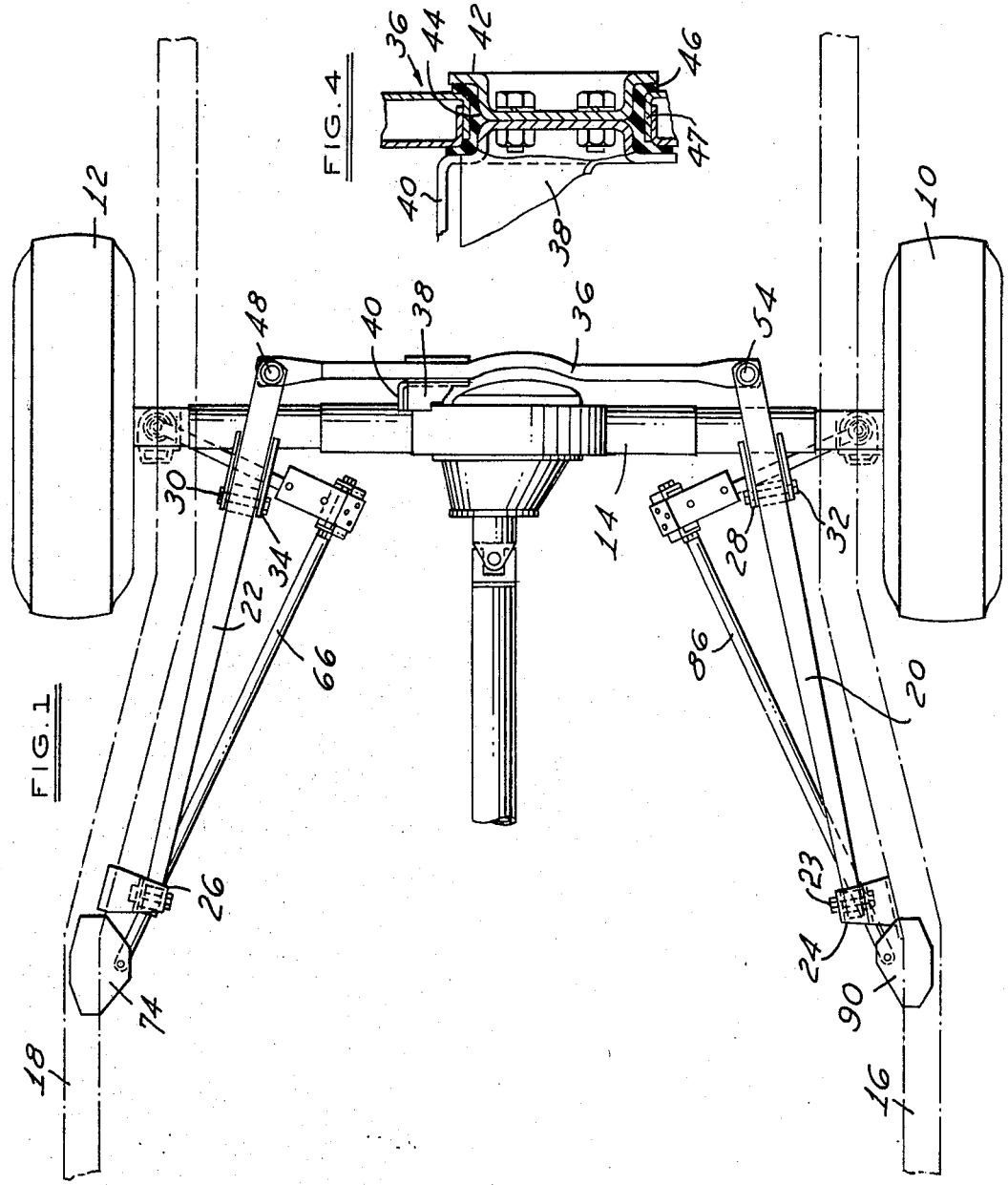
FIGURE 1 is a top plan view of the rear suspension system of a motor vehicle incorporating the presently preferred embodiment of this invention.

Referring now to the drawings for a more complete understanding of this invention, FIGURE 1 illustrates a rear suspension incorporating the presently preferred embodiment of this invention. In FIGURE 1, left and right road wheels 10 and 12 are interconnected by a rigid axle housing 14. A chassis support structure including frame side rails 16 and 18 are supported on the axle housing 14 by means of a unique linkage system.

Figure 3:
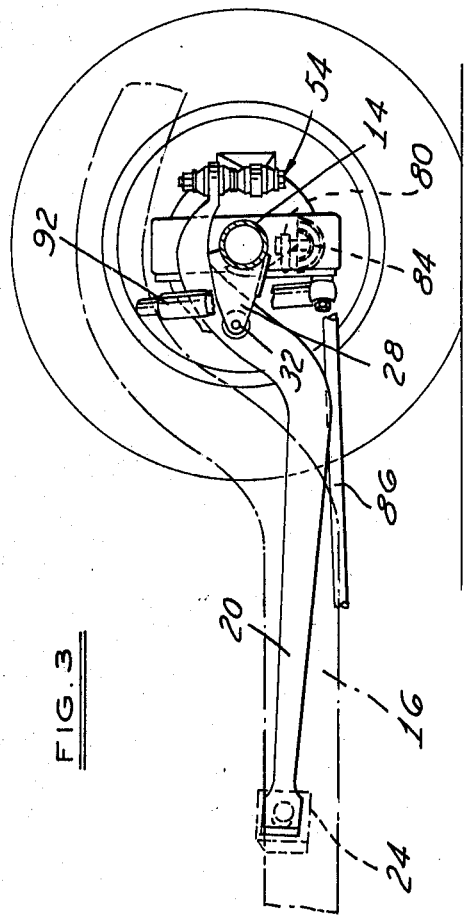
FIGURE 3 is a side elevational view, partly in section, of the connection between the balancing lever and the axle housing.

The forward ends of left and right suspension arms 20 and 22 are pivotally connected as at 23 to frame brackets 24 and 26. As seen in FIGURES 1 and 3, left and right pivot brackets 28 and 30 are welded to the axle housing 14 and extend forwardly therefrom. The suspension arms 20, 22 are pivotally connected to the frame brackets 24, 26 at an intermediate point and have generally hook-shaped ends that pass over the top of the axle housing 14. The axle housing brackets 28, 30 are pivotally connected at 32 and 34 to the suspension arms 20, 22 at a point forwardly of the portion that kicks up over the axle housing.

A laterally extending balancing lever 36 is connected to a support bracket 38 that is positioned to the right of the center of the axle housing 14. The bracket 38 is formed of sheet metal parts 40 and 42 that are bolted together to form an annular groove 44 as seen in FIGURE 4. An annular rubber element 46 is fitted within the groove and engages the edge of a hole 47 in the balancing lever 36. This construction provides a pivotal connection between the lever 36 and the axle housing 14. As noted in FIGURE 2, the pivotal connection provided by the bracket 38 is positioned to the right of the center of the axle housing 14 and to the right of the center of the balancing lever 36.

A shackle 48 interconnects the rear end of the suspension arm 22 and the balancing lever 36. The shackle 48 includes pairs of rubber elements 50 and 52 that are positioned on either side of the ends of the lever 36 and the arm 48. The rubber elements 50, 52 encircle a bolt which comprises the core of the shackle 48. A shackle 54 having a similar construction interconnects the rear end of the arm 20 and the left end of the lever 36.

Figure 2:
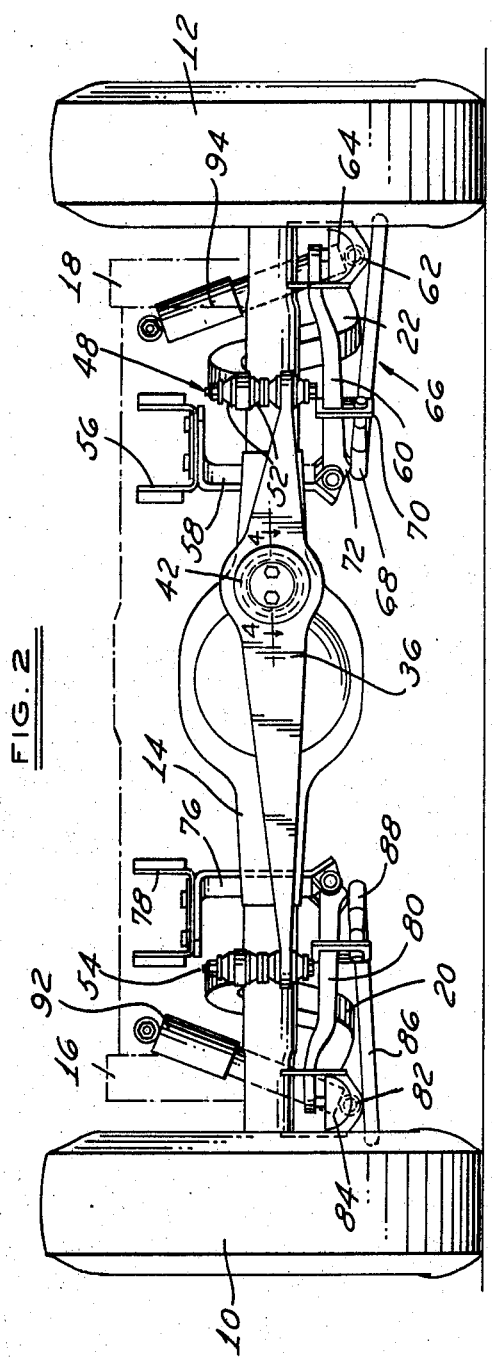
FIGURE 2 is a rear elevational view of the suspension of FIGURE 1.

Means are provided to position the axle housing laterally with respect to the frame of the vehicle. In FIGURE 2, a frame bracket 56 supports the upper end of a spring metal hanger 58. The hanger 58 extends downwardly and is pivotally connected to a laterally extending suspension arm 60 by a resilient bushing assembly having a substantially horizontal pivot axis.

A bracket 62 is welded to the outer end of the axle housing 14 adjacent to the wheel 12. This bracket is pivotally connected to the outer ends of the lateral arm 60. The bracket 62 is provided with a cup-shaped rubber layer and a second cup-shaped metal piece 64 that rides on top of the rubber layer. The outer end of the arm 60 has a depending portion that is seated in the metal piece 64. This connection operates in the fashion of a ball and socket joint between the lateral suspension arm 62 and the axle housing 14. The rubber layer permits movement between the components while isolating noise and vibration to the axle housing that might otherwise be transmitted to the vehicle chassis through the suspension arm 60 and the spring metal hanger 58. This construction is described in greater detail in my United States Patent 3,259,201 issued July 5, 1966 and entitled "Linkage Type Rear Suspension System for a Motor Vehicle."

A torsion bar 66 for the right side of the vehicle has a bent lever end portion 68. The portion 68 is connected to the lateral arm 60 by means of an annular shackle 70 that surrounds both the arm 60 and the tip of the torsion bar portion 68. A fulcrum portion 72 is formed on the arm 60 and supports the bar 66 at the bond forming the end portion 68.

The forward end of the torsion bar 66 is secured to a bracket 74 that is welded to the frame side rail 18. The construction of the torsion bar 66 and its connection to the lateral arm 60 and the frame member 18 is of the general type described in my previously mentioned Patent 3,259,201.

The foregoing description presents the structure on the right side of the vehicle. The arrangement on the left side is similar. A spring metal hanger 76 is connected to a frame bracket 78 and has a lower end that pivotally supports a laterally extending suspension arm 80. The inner end of the arm 80 is pivotally connected to the spring meetal hanger 76 and its outer end is connected to an axle housing bracket 82 by means of a ball and socket joint 84. A left torsion bar 86 has a bent end portion 88 that is connected to the lateral arm 80 and a forward end that is connected to a frame bracket 90.

Left and right shock absorbers 92 and 94 are interposed between the axle housing brackets 82, 62 and the frame of the vehicle to dampen relative movement.

The present invention is an improvement in the suspension of the type described in my Patent 3,259,201. In that patent, a torque reaction tube surrounds the drive shaft and extends forwardly from the differential housing portion of the axle housing. The tube is connected to the frame at its forward end to prevent axle rotation. In the present invention, the torque tube is eliminated and the connection of the trailing suspension arms with the axle housing is of a unique type which permits jounce and rebound wheel movement, but prevents rotation during acceleration and braking.

With this suspension, rotation of the axle housing is prevented by the spaced connections between the suspension arms 20, 22 and the axle housing 14. The spaced connections comprise the pivots 30 and 32 and the connection between the axle mounted balancing lever 36 and the ends of the arms 20, 22.

This linkage arrangement provides a torque reaction means during acceleration and braking, but permits slight axle windup to reduce harshness and vibration. The axle position is precisely determined, however, it is free to move in jounce and rebound to absorb road irregularities. The spring hangers 58 and 76 permit resilient lateral movement of the axle housing. Such movement is referred to as lateral compliance and has the advantages described in the aforementioned Patent 3,259,201.

In the conventional rear suspension system in which the arms are symmetrically arranged, the torque reaction of the rotating drive shaft will cause an increase in the loading of the left rear wheel. As a result, the left and right rear wheels will have unequal traction and the right wheel may slip during acceleration due to its reduced loading. This is obviously objectionable and has been overcome in the present suspension system. The balancing lever 36 is supported on the axle housing by the off-center bracket 38. The off-center mounting of the pivot for the lever 60 results in unequal loading on the trailing arms 20, 22 and on the axle housing 14. This unequal loading counteracts the torque reaction and thereby reduces torque steer. It provides more equal traction between the rear wheels during acceleration in order to reduce right wheel slip.

The foregoing decription presents the presently referred embodiment of this invention.

I claim:
1. A suspension system for a motor vehicle having a vehicle chassis, a pair of rear driving wheels, rigid axle housing means extending between said wheels and rotatably supporting said wheels, differential gear means interposed in said axle housing means and connected to said wheels, suspension arms having one of their ends pivotally connected to said chassis, connection means connecting said arms to said axle housing means and constructed to resist rotation of said axle housing means during acceleration and braking of said vehicle, said connecting means including a balancing lever extending generally transversally of said vehicle, pivot means connecting said lever to said axle housing means, and articulated means connecting said lever to said suspension arms.

2. A suspension system for a motor vehicle according to claim 1 and including:
the axis of the pivot means for said balancing lever being asymmetrically arranged with respect to the longitudinal axis of said vehicle.

3. A suspension system for a motor vehicle according to claim 1 and including:
said pivot means connecting said balancing lever to said axle housing means at a point offset from the center of said axle housing means and from the center of said axle housing means and from the center of said balancing lever in a direction longitudinally of said housing and lever.

4. A suspension system for a motor vehicle according to claim 1 and including:
said connection means also including means pivotally connecting each of said suspension arms to said axle housing means.

5. A suspension system for a motor vehicle according to claim 1 and including:
said connection means also including means connecting each of said suspension arms to said axle housing means spaced from said articulated means.

6. A suspension system for a motor vehicle according to claim 1 and including:
said articulated means comprising shackles situated at the other ends of said suspension arms.

7. A suspension system for a motor vehicle according to claim 1 and including:
said connection means including means pivotally connecting each of said suspension arms to said axle housing means, said articulated means comprising shackles situated at the other ends of said suspension arms.

8. A suspension system for a motor vehicle according to claim 1 and including:
said connection means including means connecting each of said suspension arms to said axle housing means at a point forwardly of the center line of said axle housing means and spaced forwardly from said articulated means, said articulated means comprising shackles situated at the rear ends of said suspension arms and rearwardly of the center line of said axle housing.

9. A suspension system for a motor vehicle according to claim 1 and including:
the axis of said pivot means for said balancing lever being asymmetrically arranged with respect to the longitudinal axis of said vehicle, said connection means including means connecting each of said suspension arms to said axle housing means and spaced forwardly from said articulated means.

10. A suspension system for a motor vehicle according to claim 1 and including:
said pivot means connecting said balancing lever to said axle housing having rubber means for limited movement therebetween, said connection means including means pivotally connecting each of said suspension arms to said axle housing means, said articulated means comprising shackles situated at the rear ends of said suspension arms and rearwardly of the center line of said axle housing.

11. A suspension system for a motor vehicle according to claim 1 and including:
the axis of said pivot means for said balancing lever being connected to the rear side of said axle housing means and at a point offset from the center of said axle housing means and from the center of said balancing lever in a direction longitudinally of said housing means and said lever, said pivot means connecting said balancing lever to said axle housing having rubber means for limited movement therebetween, said connection means including means pivotally connecting each of said suspension arms to said axle housing means at a point forwardly of the center line of said axle housing means and spaced forwardly from said articulated means, said articulated means comprising shackles situated at the rear ends of said suspension arms and rearwardly of the center line of said axle housing.

12. A suspension system for a motor vehicle having a vehicle chassis, a pair of wheels, rigid axle means extending between said wheels and rotatably supporting said wheels and housing drive means drivingly connected to said wheels, wheel positioning means extending in a generally longitudinal direction and having one of their ends pivotally connected to said chassis, connection means connecting said wheel positioning means to said axle means and constructed to limit rotation of said axle means during acceleration and braking of said vehicle, said connecting means including a link extending generally transversely of said vehicle, pivot means connecting said link to said axle means, and articulated means connecting said link to said suspension arms.

13. A suspension system for a motor vehicle having a vehicle chassis, a pair of wheels, rigid axle means extending between said wheels and rotatably supporting said wheels, a pair of wheel positioning means extending in a generally longitudinal direction and having one of their ends pivotally connected to said chassis, first connection means pivotally connecting said wheel positioning means to said axle means, second connecting means interconnecting said wheel position means, said second connecting means being pivotally connected to said axle means.

14. A suspension system for a motor vehicle according to claim 13 and including:
shackle means interconnecting said second connecting means and said wheel position means.

References Cited

UNITED STATES PATENTS 2,582,775  1/1952  Giacosa.
3,194,336  7/1965  McHenry _____ 180—73

A. HARRY LEVY, Primary Examiner

U.S. Cl. X.R.,
280—124